United States Patent [19]
Collins

[11] Patent Number: 5,641,573
[45] Date of Patent: Jun. 24, 1997

[54] PRINTED SYNTHETIC RESINOUS CORKS AND METHOD OF MAKING SAME

[75] Inventor: David B. Collins, Alta Loma, Calif.

[73] Assignee: Lermer Packaging Corp., Garwood, N.J.

[21] Appl. No.: 154,503

[22] Filed: Nov. 19, 1993

[51] Int. Cl.$^6$ .................................................. B32B 9/04
[52] U.S. Cl. ...................... 428/409; 215/355; 428/447; 428/452; 428/455; 428/456; 428/497; 428/543
[58] Field of Search ................ 215/355; 428/455, 428/456, 497, 446, 447, 452, 409, 64, 543; 430/8

[56] References Cited

U.S. PATENT DOCUMENTS

| | | | |
|---|---|---|---|
| 686,008 | 11/1901 | Trombert | 428/455 |
| 857,698 | 6/1907 | Weissenthanner | 428/455 |
| 4,188,457 | 2/1980 | Throp | 428/542 |
| 4,363,849 | 12/1982 | Paisley et al. | 428/318.8 |
| 4,499,141 | 2/1985 | Paisley et al. | 428/318.8 |
| 4,521,266 | 6/1985 | Careddu | 156/242 |
| 4,522,856 | 6/1985 | Paisley et al. | 428/64 |
| 4,696,589 | 9/1987 | Okuno et al. | 400/119 |
| 4,826,029 | 5/1989 | Skoglie | 217/110 |
| 5,317,047 | 5/1994 | Sabate et al. | 524/16 |

*Primary Examiner*—H. Thi Le
*Attorney, Agent, or Firm*—Charles E. Temko

[57] ABSTRACT

A method for printing the cylindrical side surfaces of synthetic resinous corks used for wine bottles which are normally not receptive to printing inks. The method includes the steps of gas flame heating of the corks to slightly soften the surface and deposit unburned carbon particles thereat. The application of a printed image using an offset roller, the drying of the ink in a heated conduit, and the subsequent application of a high viscosity lubricant in dot pattern using an offset printing roller. The application of the lubricant in a pattern covering less than the entire surface permits the cork to release sulphur dioxide gas for oxygen scavenging of any air passing into the bottle, as well as air disposed in the head space within the bottle.

4 Claims, 3 Drawing Sheets

PRINTED SYNTHETIC RESINOUS CORKS AND METHOD OF MAKING SAME

This invention relates generally to the field of wine corkage, and more particularly to an improved method for application of printing to the cylindrical side surfaces of synthetic resinous wine corks which are not normally receptive to ink, and the subsequent lubricating of these surfaces to facilitate insertion and removal relative to the neck of a wine bottle.

In the past, natural corks have been similarily printed, a relatively easy procedure, since the surface of a natural cork is readily ink-receptive. After such printing, the corks have been lubricated by a coating of paraffin wax which seals the cork completely. This is the standard procedure in most wineries. Some attempts have been made to employ a low viscosity silicon lubricant using a tumbling operation. This process has not proven suitable owing to the difficulty of controlling the thickness of the lubricant, with an adverse effect on cork extraction from the bottle.

Reference is made to U.S. Pat. No. 4,188,457 granted to Arnold M. Throp, and presently assigned to the same assignee as the instant application.

The patent relates to synthetic resinous cork capable of liberating sulphur dioxide in vapor form as an oxygen scavenger to exclude the passage of oxygen past the cork into the interior of the bottle, and react with any oxygen present in the head space within the bottle to form a sulphur compound which is normally present in wine, whereby the contents of the bottle are protected against spoilage over an extended period of shelf life. Corks of this type obviously require an outer surface which is liquid impervious, but not vapor impervious. While lubrication of this surface remains desirable, it is essential that the lubricant, after application, still permit vapor perfusion.

SUMMARY OF THE INVENTION

Briefly stated, the invention contemplates the provision of an improved method for application of a printing ink to the side surfaces of a synthetic resinous cork of the type described in the above-mentioned patent which assures that the printing will readily adhere to the surface, the subsequent drying of the ink, and the application of a lubricant which will permit the passage of sulphur dioxide from the interior of the cork body to provide the above-described scavenging action. This is accomplished by the application of a relatively high viscosity lubricant in dot pattern using a printing transfer roller so that a substantial portion of the surface remains uncovered.

BRIEF DESCRIPTION OF THE DRAWING

In the drawings, to which reference will be made in the specification.

DETAILED DESCRIPTION OF THE DISCLOSED EMBODIMENT

In accordance with the invention, the method comprises essentially four individual steps, namely the initial treatment of the outer surface of the corks to render the same ink-receptive; the application of a printing ink to the prepared surface; the subsequent drying of the imprinted image; and finally, the application of a relatively high viscosity lubricant over the printed image on less than the entire surface to enable vapor transmission from the interior of the cork through the surface.

Figure 1:
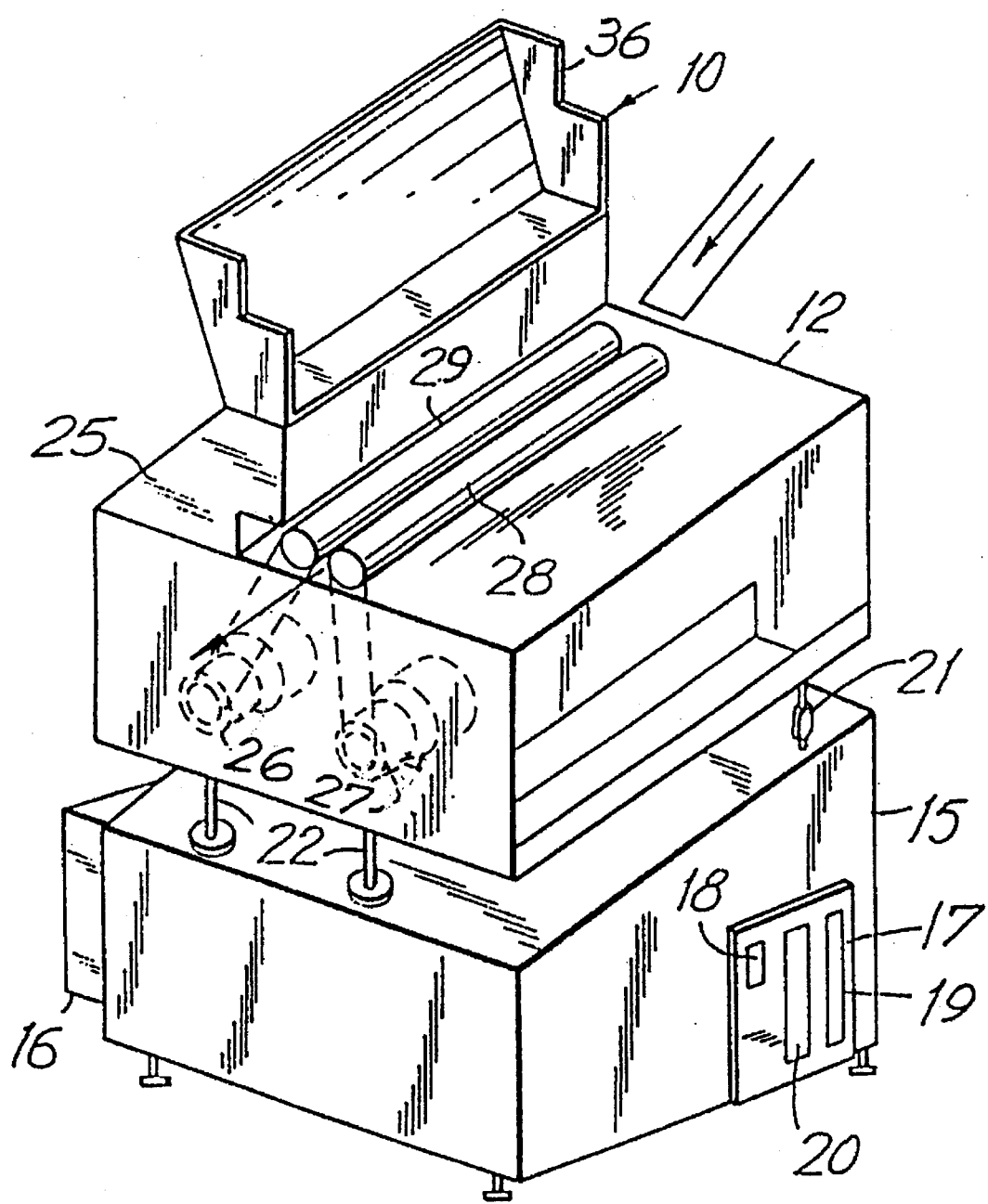
FIG. 1 is a perspective view of a device used for the initial treating of the outer surface of individual corks to complete a first step in the described method.

Referring to FIG. 1, this figure illustrates a cork treating device by which the corks are serially subjected to a gas flaming action which alters the smooth relatively shiny surface of the molded cork to make the same receptive to the printing ink. This is accomplished by the molecular rearrangement of the surface of the cork from a random orientation to a substantially aligned relation of the long chain hydrocarbon material comprising the cork to provide a smooth matted surface which is readily receptive to an offset roller transfer of the ink, as will more fully appear. A suitable treating machine 10 comprises broadly a lower frame element 11 and a top frame element 12 hingedly interconnected thereto.

The lower frame element 11 includes a housing 15 supporting on one side thereof an electrical control console 16 accessible to an operator. Disposed on an opposite side is a controller element 17 including a mains air controller 18, a gas controller 19, and an air mix controller 20 which mix natural or similar gas for feeding to an elongated burner (not shown) disposed within the housing 15. Adjusting screws, one of which is indicated by reference character 21, adjusts the angle between the base frame element and top frame element 12 about vertical supports 22.

The top frame element 12 includes a second housing 25 supporting first and second drive motors 26 and 27, which rotate belt driven cork feed rollers 29 and 28. The rollers rotate in the same direction, one somewhat faster than the other, permitting individual corks to be rotated through approximately 3-½ to 4 revolutions as they travel in serial fashion from the upper ends thereof to the lower ends under the action of gravity. The rollers 28–29 define a gap for gas flames emanating from the base frame element which heat the outer surfaces of the cork and provide a matted surface readily receptive to the printing ink, as described above.

During operation, a pivotally mounted guard 36 is in closed condition. Because of the close proximity of the gas burners to the feed roller, overheating has been obviated by inclusion of water cooling the rollers 29 and 28. The water is supplied via rotary unions (not shown) which are fitted to the component feed end of the rollers.

The top frame is mounted from a hinge point on the base frame, at an inclined angle of approximately 30 degrees. This angle of incline can be adjusted, and the feature has been included so that the optimum condition for handling various size corks can be met. Also, experience has proved that the high surface resistance of the cork to printing can be altered by changes in temperature (poor setting of the gas burner, variations in gas outputs, etc.), and this change of resistance can affect the conveying characteristics.

For the sake of safety, as the guard 36 is moved to an open position, an electrical safety switch (not shown) which is interlocked to solenoid operated gas valves, cuts the supply of gas to the burners. At the same time, the ignition controller is switched off, thus protecting the operator from burns. Upon closing the guard, the gas supply is returned and automatically ignited. Opening the guard also switches off the electrical current to the feed roller motors, and to restart the drive, the operator must manually reset a start button situated on the electrical console, and this can be operated only with the guard closed. The corks are removed from the feed rollers by a moving take off belt (not shown) and conveyed over a short distance to the marking machine conveyor 37.

Figure 2:
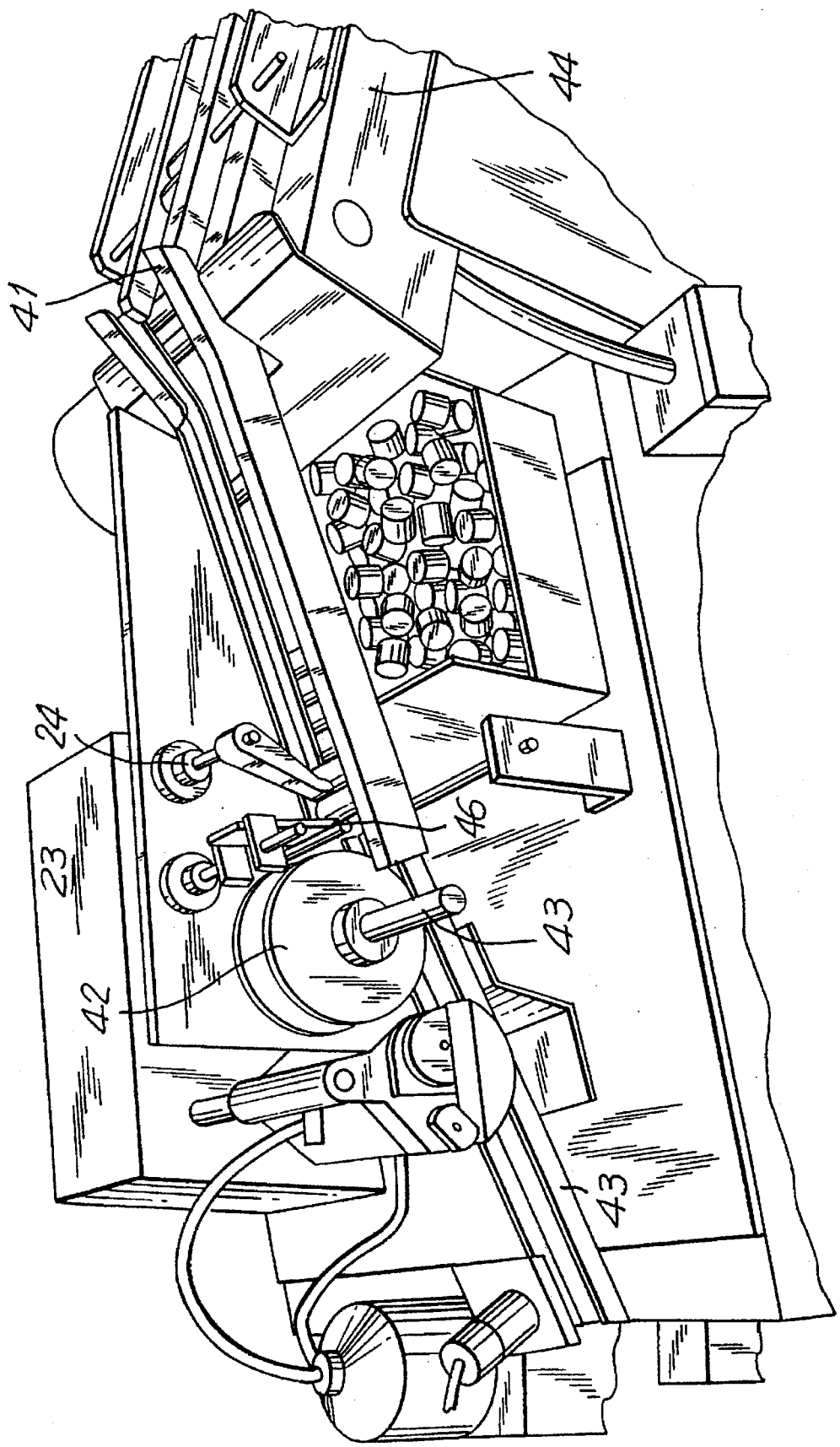
FIG. 2 is a schematic view in perspective showing the printing of the corks as a second steps in the method.

Referring to FIG. 2 in the drawing, there is illustrated a marking machine suitable for the instant purpose. This station includes an offset printer 40, typically a Markem, Model 165, Mark II available from Markem Corp. Similar devices are also suitable. The machine is modified to provide a feed-in chute 41 together with a double mechanical hold back device to separate and individually feed corks to the die roll 42. The machine includes an adjustable feed-off chute 43, and support and hold-down fingers (not shown). The machine is capable of printing 170 corks per minute. Each machine cycle consists of inking a printing stereo plate on the die roll 42, placing a cork in the print position, printing the cork, and ejecting it.

To accomplish this, the corks are first conveyed from the treating machine and fed under power by a bar feeding unit 44 into the feed chute 45, where they travel by gravity down the chute, being aligned by feed chute guides. The corks pass through a "tick-tock" mechanism 46, comprised of two hold-back levers which are sited close together near the print head. The first of these levers holds back a stack of corks in the chute and releases only one cork per cycle onto the second lever where the cork is held in place until the next print cycle. On the print cycle, the cork is again released, allowing it to roll down onto support fingers where it is held against the roll die with hold-down fingers and then printed.

The ink employed is normally of a known type, a reactive catalyzed printing ink system using pigments and resins listed in "Food & Drug Administration", Title 21, Subsection 175.300 entitled "Resinous and Polymeric Coatings". All are classed as non-toxic. The system is polymerized and designed to be non soluble in water, alcohol and other ingredients used in various beverages. The ink weight on the total package is in the order of sub parts per million.

Figure 3:
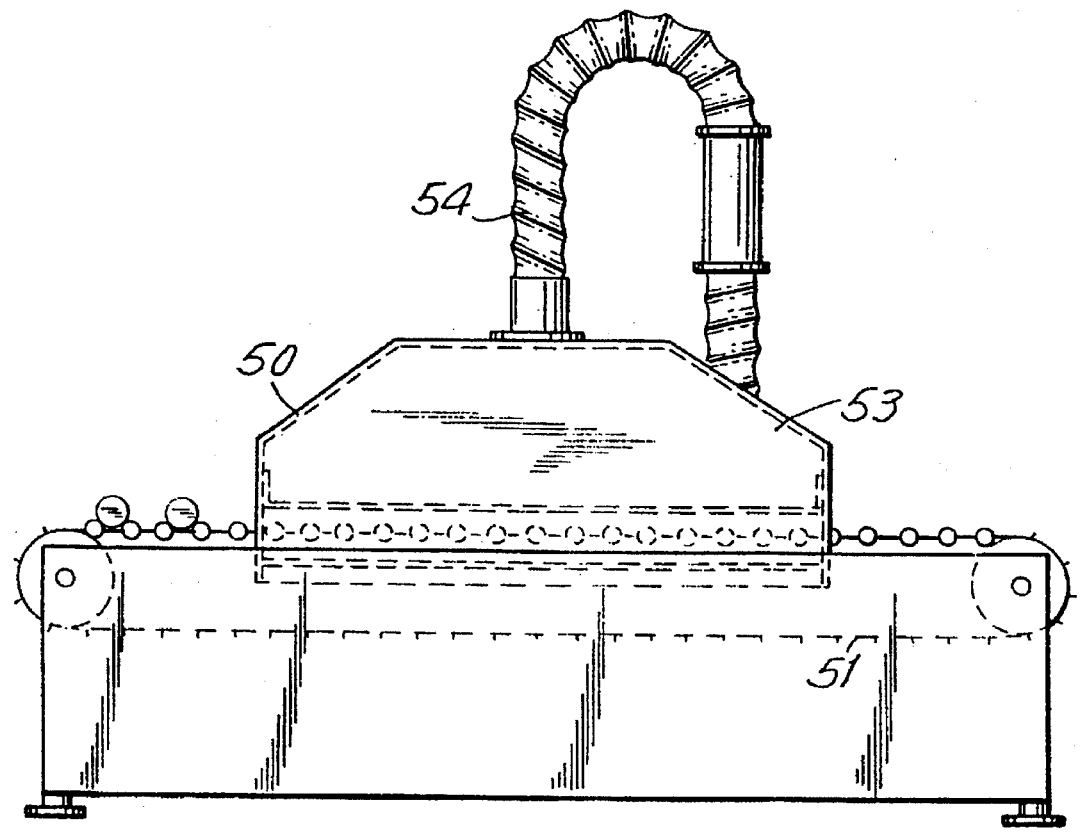
FIG. 3 is a schematic view in perspective showing a final step in the disclosed method comprising the application of a lubricant to the corks.

The next step is the drying of the printed corks, and this is accomplished by conveying them through a hot air tunnel 50 (FIG. 3) which dries the ink and extracts any sodium dioxide gas or solvent fumes remaining after the printing step. The corks exit the tunnel 50 near the end of a conveying track 51, which is chain driven by an electrical motor. The drive and conveying chains are protected against any cork jam-up by a torque-limiting chain wheel (not shown). At the end of the conveying track, the corks are mechanically ejected by a star-wheel (not shown) into a transfer chute to a lubrication bar-fed conveyor.

Figure 4:
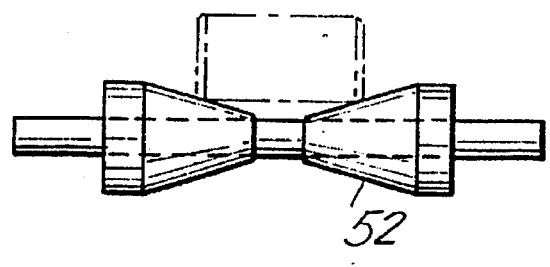
FIG. 4 is an enlarged transverse view as seen from the plane 4—4 in FIG. 3.

Corks which have just been printed and still wet with ink are conveyed on cone carriers 52 (FIG. 4) to the hot air drying tunnel 50. The corks sit between a pair of carriers, with only the end edges of the cork contacting the cones, thus avoiding any smudging of the ink.

The drying tunnel comprises a fabricated cowling 53 which has been treated with a galvanized paint to give it protection against gasses and fumes. Connected to the top of the cowling is a flexible pipe 54 through which hot air is blown, by a fan from an external heater 55. The flexible pipe allows the cowling which is hinged at the base to be opened, such that access to the track 51 and tunnel 50 may be gained, at the same time breaking an electrical current to a safety microswitch which is interlocked to both drives of the drier and lubricator bar-feed conveyor, thus stopping the drive. When the cowling is closed, both drives and fan heaters can be switched on. The hot air is blown down into the top of the cowling and directed by side plates over the cork surfaces, as the corks are conveyed by the conveying track 51. Beneath the track is a perforated steel sheet 56 which restricts the hot air passing therethrough, thus enhancing the drying characteristics to the underside of the cork. Below the perforated plate toward the take-off end, is an extraction duct (not shown) for sucking any fumes which may exist, which are subsequently blown by a fan through a pipe to atmosphere.

The corks emerge from the drying tunnel near the end of the conveying track 51. At the end are shaft driven chain wheels and mounted between these is a tooth star wheel, each tooth synchronized to move between the pitch of the chain carriers and eject each cork onto a chute. The chute transfers to cork down to a lubrication bar-feed conveyor similar to that seen in FIG. 2.

The dryer has been designed to handle 180 corks per minute, spaced on a 1½ inch pitch, and conveyed at a linear speed of 22.5 feet per minute by a fixed speed motor. The tunnel has a length of four feet and provides the cork with eleven seconds of drying time. Drying temperature varies from approximately 23 degrees C. to 30 degrees C.

The final step in the method is the provision of a coating of lubrication on the printed surfaces of the cork to provide the known function of facilitating the insertion of the same into the neck of a wine bottle, and its subsequent removal. In the case of a synthetic resinous cork of the disclosed type, the cork is not only inherently more compressible due to its closed cell construction, but substantially smoother on the surfaces engaging the neck of the bottle. Thus, insertion is somewhat easier than with natural corks. However, it is necessary to use the lubricant to control the extraction force for cork removal in order that the cork remain firmly seated until opening of the bottle is desired. In addition, the lubrication must be applied in a manner which will allow the cork to vent sulphur dioxide gas in the manner above described. The solution to these requirements is based upon three factors.

A) The first factor is the precise control of the application of a high viscosity silicon oil using a modified offset printer much like that used for the printing step. The printer has a very accurate and sensitive metering ink reservoir, and when used with silicon oil, instead of ink, produces an acceptable film of lubricant which can be adjusted from 0.5 to 3.0 mgs. per cork. In most applications, the minimum specification calls for 1 mg. of silicon per cork.

A second factor is the necessity of using a high viscosity silicon oil, rather than low viscosity silicon oils used in the prior art. A suitable oil is available from Dow Corning which also complies with FDA indirect food additive regulations set forth in 21 CFR 175.300 (formerly 21 CFR 121.2514) subject to any applicable extractive limitations.

A third factor lies in the fact that the above silicon oil is transparent and contains no color, therefore requiring a rather unique method for testing for correct application levels. This is achieved by using a nodular stereo printing blanket with approximately 80 percent application area, which has the effect of implanting small dots of silicon oil to the cork surface. Adequate printing of the dots is checked by the use of clear cellophane tape which can be applied to the lubricated cork, and when removed, the silicon dots are seen on the adhesive side of the tape giving the required proof of lubrication.

I wish it to be understood that I do not consider the invention to be limited to the precise details set forth in the specification, for obvious modifications will occur to those skilled in the art to which the invention pertains.

I claim:

1. A lubricated synthetic resinous cork for wine bottles and the like comprising: a cork body having provision for exuding sulphur dioxide into interior of an engaged wine bottle after installation through a cylindrical side surface thereof, said side surface having a coating of high viscosity silicon oil of sufficiently high viscosity such that said oil is capable of forming a lubricant film of 0.5 to 3.0 mg. cork covering less than the entire surface thereof; whereby said cork, after installation thereof, may exude sulphur dioxide through the areas not covered by said silicon oil coating.

2. A lubricated synthetic resinous cork for wine bottles and the like comprising: a body having provision for exuding sulphur dioxide into the interior of an engaged wine bottle after installation thereof, through at least a cylindrical side surface thereof, said cylindrical surface having a printed ink impression thereon formed by an ink transfer roll, said side surface having a high viscosity silicone oil, coating of sufficiently high viscosity such that said oil is capable of forming a lubricant film of 0.5 to 3.0 mg. per cork covering subtantially less than the entire surface thereof, whereby said cork, after installation, may exude sulphur dioxide through the area not covered by said silicon oil coating.

3. A cork in accordance with claim 2 in which said coating is applied to said side surfaces as a dot pattern coating.

4. A cork in accordance with claim 3, in which the dot pattern comprises approximately 80 percent of the total coated area.

* * * * *